United States Patent [19]

Shigenaga

[11] Patent Number: 4,710,613
[45] Date of Patent: Dec. 1, 1987

[54] IDENTIFICATION SYSTEM
[75] Inventor: Yoshimi Shigenaga, Tokyo, Japan
[73] Assignee: Casio Computer Co., Ltd., Tokyo, Japan
[21] Appl. No.: 805,187
[22] Filed: Dec. 4, 1985
[30] Foreign Application Priority Data
Dec. 13, 1984 [JP] Japan .................... 59-263331
[51] Int. Cl.$^4$ .............................. G06K 5/00
[52] U.S. Cl. ................... 235/380; 235/379; 235/493; 340/825.34; 380/25
[58] Field of Search ............... 235/379, 380, 382, 493; 380/24, 25; 340/825.34

[56] References Cited
U.S. PATENT DOCUMENTS
4,123,747 10/1978 Lancto et al. ................ 380/25
4,423,287 12/1983 Zeidler ..................... 235/382 X
4,529,870 7/1985 Chaum ..................... 235/379 X Primary Examiner—David L. Trafton
Attorney, Agent, or Firm—Frishauf, Holtz, Goodman & Woodward

[57] ABSTRACT

An identification system wherein validity between a first unit and a second unit is identified when the first unit is electrically communicated with the second unit. The first unit includes a generator for generating identification code information, a calculator for calculating, based upon the identification code information, an estimation time required for processing the identification code information in the second unit, a time counter for measuring an actual time required for completely processing the identification code information in the second unit, and an unit for identifying validity between said first and second units by comparing the actual processing time to the estimation processing time. The second unit includes at least a processor for processing the identification code information sent from the first unit.

14 Claims, 7 Drawing Figures

IDENTIFICATION SYSTEM

BACKGROUND OF THE INVENTION

1. Field of the Invention

The present invention generally relates to an identification system and, more specifically, to a system suitable for identifying whether or not an identification article such as an IC card, or an article identifying unit is indeed authorized.

2. Description of the Prior Art

A conventional magnetic card is well known in such an article identification system. The magnetic card has a magnetic coating stripe on which a key code, a confidential number, an account number and so on are magnetically recorded. These magnetically recorded contents, e.g., the key code are known to at least bank personnel because a card holder as a user has his duty to disclose his key code to the bank. In general, the magnetically recorded information may be relatively easily accessed by everyone. In view of such an easy access, the private confidential information of the conventional magnetic card may not be kept secret.

Instead of the conventional magnetic card, an IC card incorporating an IC (integrated circuit) module has recently been proposed. Accordingly, no one can easily gain access to the confidential information stored in the IC module.

Although it is very hard to read out the confidential information from the IC card, there is no way to identify the authorized card holder if the IC card per se is forged. Moreover, another difficulty exists in whether the IC card terminal as the card identifying unit is authorized or not.

An object of the present invention is to provide an identification system in which when the identification system performs the identification for the apparatus to be identified, this identification can be realized by simple hardware and software and furthermore the confidential data cannot be easily analyzed nor imitated by an unauthorized person.

SUMMARY OF THE INVENTION

The foregoing problems are overcome and other advantages are provided by an identification system wherein validity between a first unit and a second unit is identified when the first unit is electrically communicated with the second unit, the first unit including means for generating identification code information, means for calculating, based upon the identification code information, an estimation time required for processing the identification code information in the second unit, means for measuring an actual time required for completely processing the identification code information in the second unit, and means for identifying validity between the first and second units by comparing the actual processing time to the estimation processing time, and the second unit including means for processing the identification code information sent from the first unit.

BRIEF DESCRIPTION OF THE DRAWINGS

The aforementioned aspects and other features of the invention are explained in the following description, taken in connection with the accompanying drawings, wherein.

DETAILED DESCRIPTION OF THE PREFERRED EMBODIMENTS

BASIC IDEA OF THE INVENTION

Before proceeding with various embodiments, a basic idea of the present invention will now be summarized.

The identification system according to the present invention is mainly constituted by a first unit and a second unit detachedly and electrically connected to the first unit. The first unit, e.g., an IC card terminal verifies whether or not the second unit, e.g., an IC card is authorized in the following way, when the first unit is communicated with the second unit.

The first unit includes:

a generator for generating identification code information such as encryption data;

an estimation device for estimating a time required for processing or decrypting the identification code information;

a timer unit for measuring an actual time required for processing or decrypting the identification code information in the second unit; and a decision unit for deciding whether the second unit is authorized by comparing the actual time with the estimated time.

The second unit includes a processor for processing or decrypting the identification code information.

It should be noted that the functions of both the first and second units are interchangeable, and any appliances may be applied to the first and second units.

For instance, this identification system may be utilized in an IC card system. The first unit corresponds to a card terminal while the second unit corresponds to an IC card. Conversely, the first unit is an IC card including all of the above-described circuit elements and the second unit is a card terminal including the processor.

It is of course possible that for instance, both of an IC card and a card terminal include all of both the above-described circuit elements, i.e., a combination of the encryptor and the decryptor. That is, the card terminal first produces the encryption data and sends it to the IC card. Then IC card decrypts this encryption data and thereafter produces and transfers another encryption data to the card terminal. Finally the card terminal decrypts this encryption data.

To identify whether the card terminal and/or the IC card is authorized, these units compare the actually measured time with the estimation time.

ARRANGEMENT OF IDENTIFICATION SYSTEM

Figure 1:
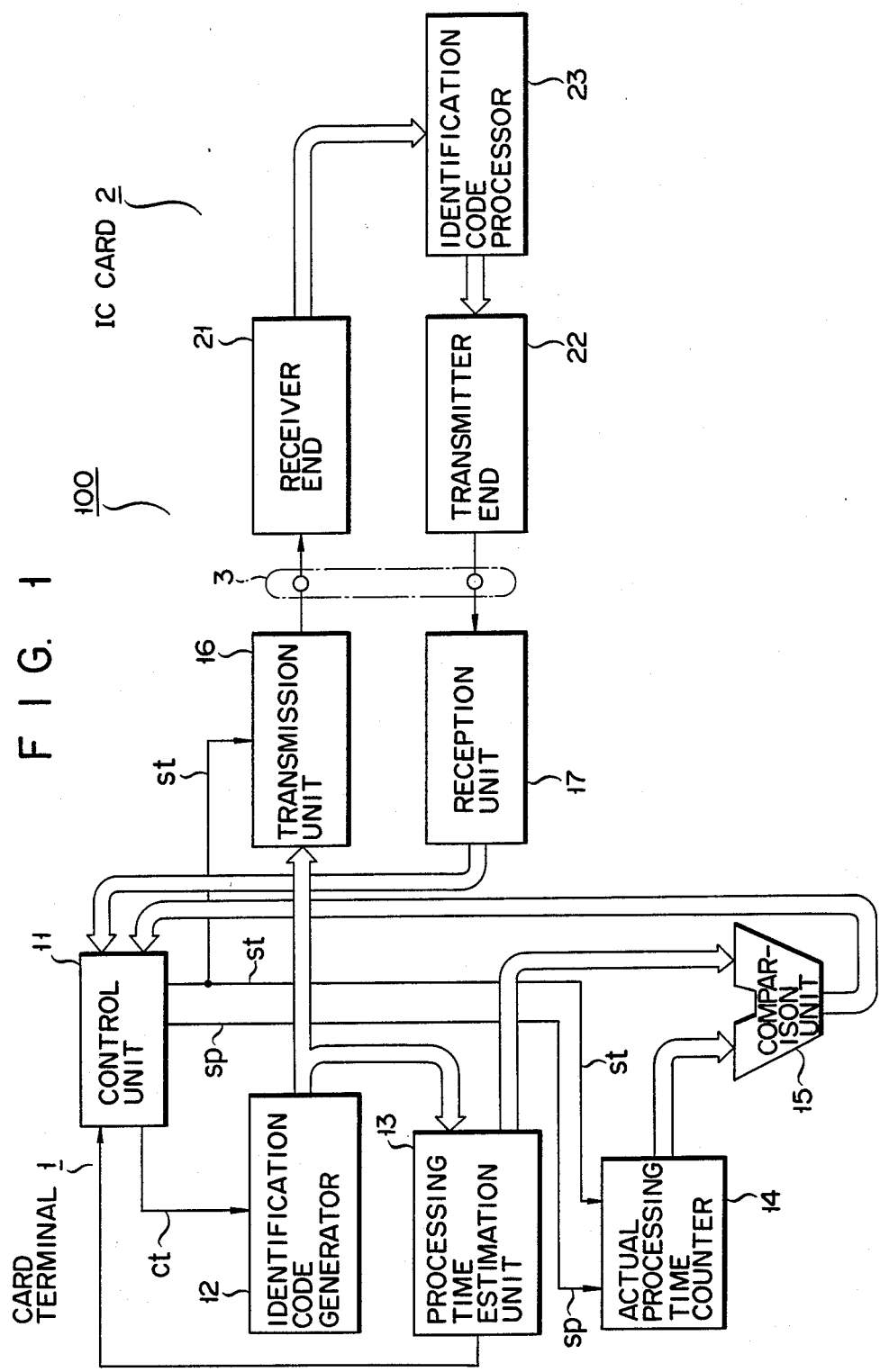
FIG. 1 is a schematic block diagram of an identification system according to one preferred embodiment of the invention.

Referring now to FIG. 1, one identification system 100 according to the invention will be described.

FIG. 1 shows the system using a card terminal 1 as an identification unit and an IC card 2 incorporating an IC (integrated circuit) module for processing identification data as a unit to be identified.

Identification system 100 is constituted of the following circuitry. When IC card 2 is inserted into card terminal 1, their internal circuits are mutually connected through a connector 3. Card terminal 1 comprises a control unit 11, an identification code generator 12, a processing time estimation unit 13, an actual processing time counter 14, a comparison unit 15, a transmission unit 16, and a reception unit 17. Control unit 11 controls the operations of all blocks of card terminal 1 and controls each block in accordance with a predetermined sequence. Control unit 11 supplies a control signal for identification code generation "ct" to generator 12, a start signal "st" and a stop signal "sp" to counter 14, and start signal "st" to transmission unit 16. Identification code generator 12 operates in accordance with a command from control unit 11 and generates data, namely, identification code as a base which is processed by IC card 2 and outputs this data to processing time estimation unit 13 and transmission unit 16. Unit 13 estimates the processing time of IC card 2 from the identification code generated by generator 12 and supplies the value of this estimated processing time to comparison unit 15. Counter 14 starts the count-up operation in response to the start signal "st" from control unit 11 and thereafter stops the counting operation by the stop signal sp and supplies the count value to comparison unit 15. Comparison unit 15 compares the estimated processing time decided by unit 13 with the actual processing time of counter 14 and outputs the result of the comparison to control unit 11. Transmission unit 16 operates in response to the start signal "st" from control unit 11 and sends the identification code data generated by generator 12 to IC card 2. Reception unit 17 receives the result of the process sent from IC card 2 and transmits it to control unit 11.

On the other hand, IC card 2 connected to card terminal 1 through connector 3 comprises a receiver end 21, a transmitter end 22, and an identification code processor 23. Receiver end 21 receives the identification code data sent from transmission unit 16 of card terminal 1 and converts the received content to the desirable form which can be processed by processor 23 and then supplies it thereto. Processor 23 processes the identification code data from receiver end 21 in accordance with a specific algorithm which this processor itself owns and sends the result to reception unit 17 of card terminal 1 from transmitter end 22.

OPERATION OF IDENTIFICATION SYSTEM

The operation of identification system 100 will now be described.

When IC card 2 is inserted into card terminal 1, receiver end 21 and transmitter end 22 in IC card 2 are respectively electrically connected to transmission unit 16 and reception unit 17 in card terminal 1 through connector 3. When IC card 2 is inserted into card terminal 1 as mentioned above, control unit 11 outputs control signal ct for identification code and initializes identification code generator 12. Generator 12 generates different numerals such as, e.g., random numbers or the like as identification code data "n" every time an IC card is used, or a personal identification number is keyed-in with using the same IC card, and outputs these numerals to processing time estimation unit 13 and transmission unit 16. Unit 13 obtains the theoretical value of the operation processing time or estimated processing time in IC card 2 on the basis of identification code data "n" from generator 12. This theoretical value can be obtained by, for instance, setting as follows.

(A) It is assumed that identification code processor 23 in IC card 2 executes the processing content of the numerical calculation $$\alpha^n + (\beta/n) \tag{1}$$

(where, $\alpha$ and $\beta$ are constants)

(B) It is assumed that processor 23 performs the numerical calculations in combination of several fundamental operations (multiplication, division, and addition in this example).

In this case, it is assumed that the time required for multiplication is $t_1$, the time required for division is $t_2$, and the time required for addition is $t_3$.

It is assumed that the actual time required for the individual operation depends on the architecture and algorithm of processor 23 and is not influenced by the numerical values to be calculated, namely, the numerical values of the fundamental operations.

(C) It is assumed that the time required to transfer data from transmission unit 16 in card terminal 1 to receiver end 21 in IC card 2 and the time required to transfer data from transmitter end 22 in IC card 2 to reception unit 17 in card terminal 1 are T.

By preliminarily giving the respective elements of times $t_1$, $t_2$, and $t_3$ necessary for various kinds of operations and of transfer time T to processing time estimation unit 13 on the basis of the above-mentioned setting, the processing time can be estimated by the formula $$n \times t_1 + 1 \times t_2 + 1 \times t_3 + T \tag{2}$$

when identification code data "n" was given from generator 12. In this case, calculating formula (1) itself which is executed in processor 23 in IC card 2 does not need to be stored in processing time estimation unit 13 in card terminal 1 but it is sufficient that unit 13 stores the information indicating how many times the individual fundamental calculation, for example, $n \times t_1$ appears.

After processing time estimation unit 13 in card terminal 1 has finished the calculations, control unit 11 outputs start signal "st" and initializes counter 14 and at the same time sends the identification code data "n" generated by generator 12 to receiver end 21 in IC card 2 from transmission unit 16. IC card 2 transmits the identification code data "n" received by receiver end 21 to processor 23 in IC card 2. The above-mentioned numerical value calculations are executed in processor 23 and the results of the calculations are sent to reception unit 17 in card terminal 1 from transmitter end 22. In this case, the identification code data "n" is an encryption data. This encryption data is generated in identification code generator 12 on the basis of the "RSA" encryption system. In other words, identification code generator 12 performs "RSA" type of encryption based upon the "RSA" algorithm.

The results of the calculations sent to reception unit 17 are then sent to control unit 11 as soon as all data have been received. When control unit 11 receives the reception data from IC card 2, it outputs stop signal sp to stop the counting operation of counter 14. The actual measurement value of the processing time counted by counter 14 is sent to comparison unit 15 and compared with the theoretical value pre-calculated by processing time estimation unit 13. The result of the comparison of comparison unit 15 is sent to control unit 11 and the processing content to be executed next is decided on the basis of this result of the comparison. Namely, in the case where the processing time of IC card 2 substantially coincides with the theoretical value as the result of the comparison of comparison unit 15, control unit 11 determines that IC card 2 is the authorized IC card and then instructs the card user to input his personal identification number (PIN) or confidential number. By inputting the correct personal identification number, the card business such as the sales of articles or the like is then executed. Conversely, in the case where the actual processing time of IC card 2 largely differs from the theoretical value as the result of the comparison of comparison unit 15, control unit 11 determines that IC card 2 is the unauthorized card, so that it returns IC card 2 to the user without performing the subsequent processing steps.

DETAILED DESCRIPTION OF CARD TERMINAL

Figure 2:
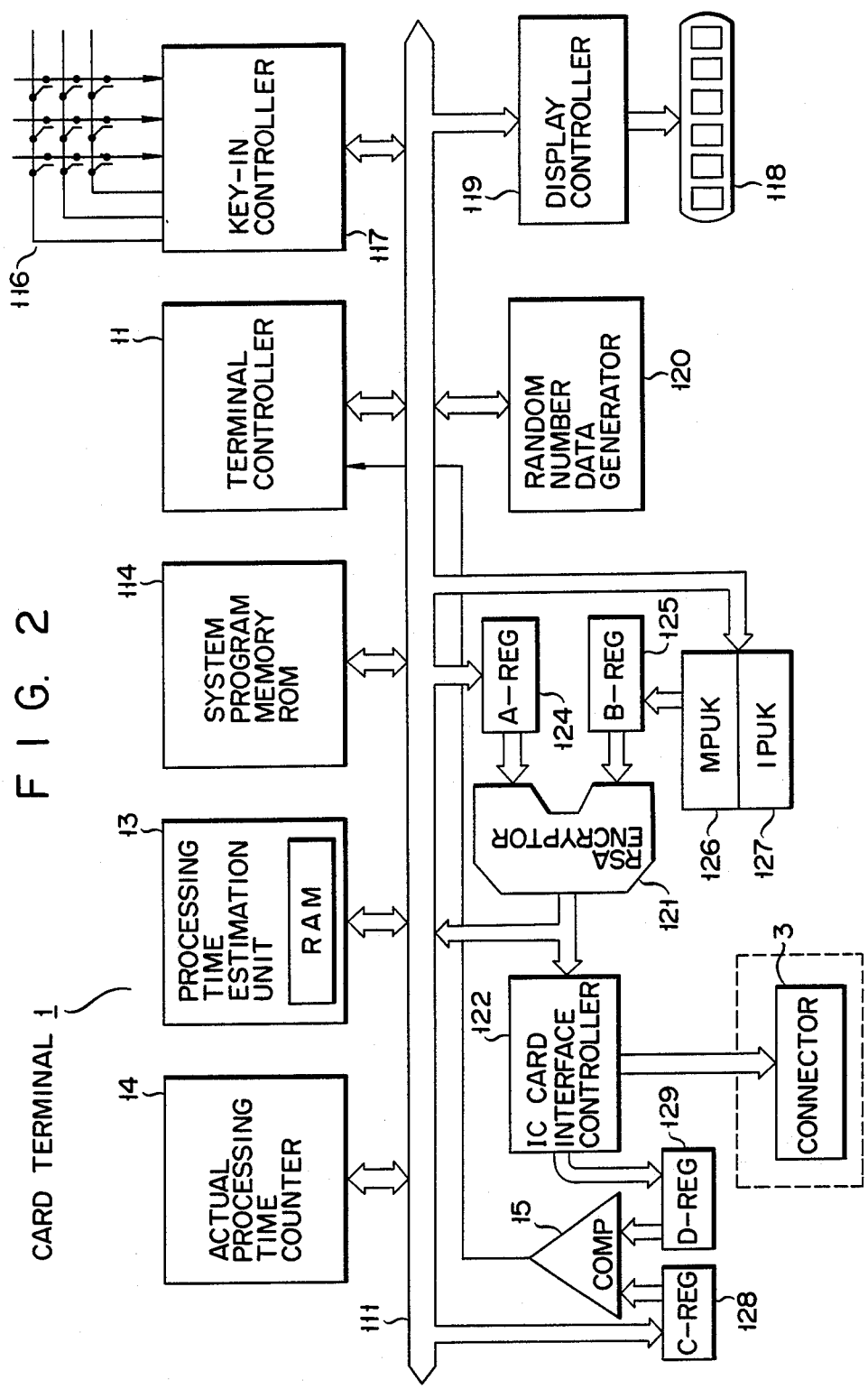
FIG. 2 is a schematic block diagram of the card terminal shown in FIG. 1.

A circuit arrangement of card terminal 1 will be first described in detail with reference to FIG. 2. In FIG. 2, a bus line 111 is provided. To bus line 111, there are connected actual processing time counter 14, processing time estimation unit 13, a system program memory 114, control unit 11, a key-in controller 117 to control a key-in unit 116, a display controller 119 to control a display unit 118, and a random number data generator 120. In the store where card terminal 1 is set, the card user inputs his personal identification number (PIN) or confidential number using key-in unit 116. The PIN number input in this way is displayed on display unit 118 under control of display controller 119. Processing time estimation unit 13 includes a RAM 131 to store operating data.

An RSA encrypter 121 to store a predetermined encryption algorithm on the basis of the foregoing RSA encryption system is connected to bus line 111. IC card 2 is also connected to bus line 111 from an IC card interface controller 122 through a connector 123. Description of IC card 2 is omitted since it has already been explained in detail above.

RSA encrypter 121 is connected to bus line 111 through a register 124 (A-REG) and also connected through a register 125 (B-REG) to an MPUK memory 126 in which an MPUK (Manufacturer Public Key Code) is stored or to an IPUK memory 127 in which an IPUK (Issuer Public Key Code) code is stored. The MPUK code is individually set by the manufacturer (manufacturing company of card terminal 1). The IPUK code is set by the manufacturer on the basis of an instruction from the issuer (for instance, credit card company that issues the IC card). Either one of MPUK memory 126 and IPUK memory 127 is designated by a control command which is sent through bus line 111 and its stored code is read out to B-REG 125. RSA encrypter 121 encrypts the data set into A-REG 124 in accordance with the key code read out from B-REG 125 and outputs to bus line 111 and IC card interface controller 122. Bus line 111 and controller 122 are connected to comparison unit 15 through a C register 128 (C-REG) and a D register 129 (D-REG), respectively. Comparison unit 15 discriminates whether the encrypted data set in C-REG 128 and D-REG 129 coincide or not and outputs the result of the comparison to control unit 11.

DETAILED DESCRIPTION OF IC CARD

A circuit arrangement of IC card 2 will then be described with reference to FIG. 3.

Figure 3:
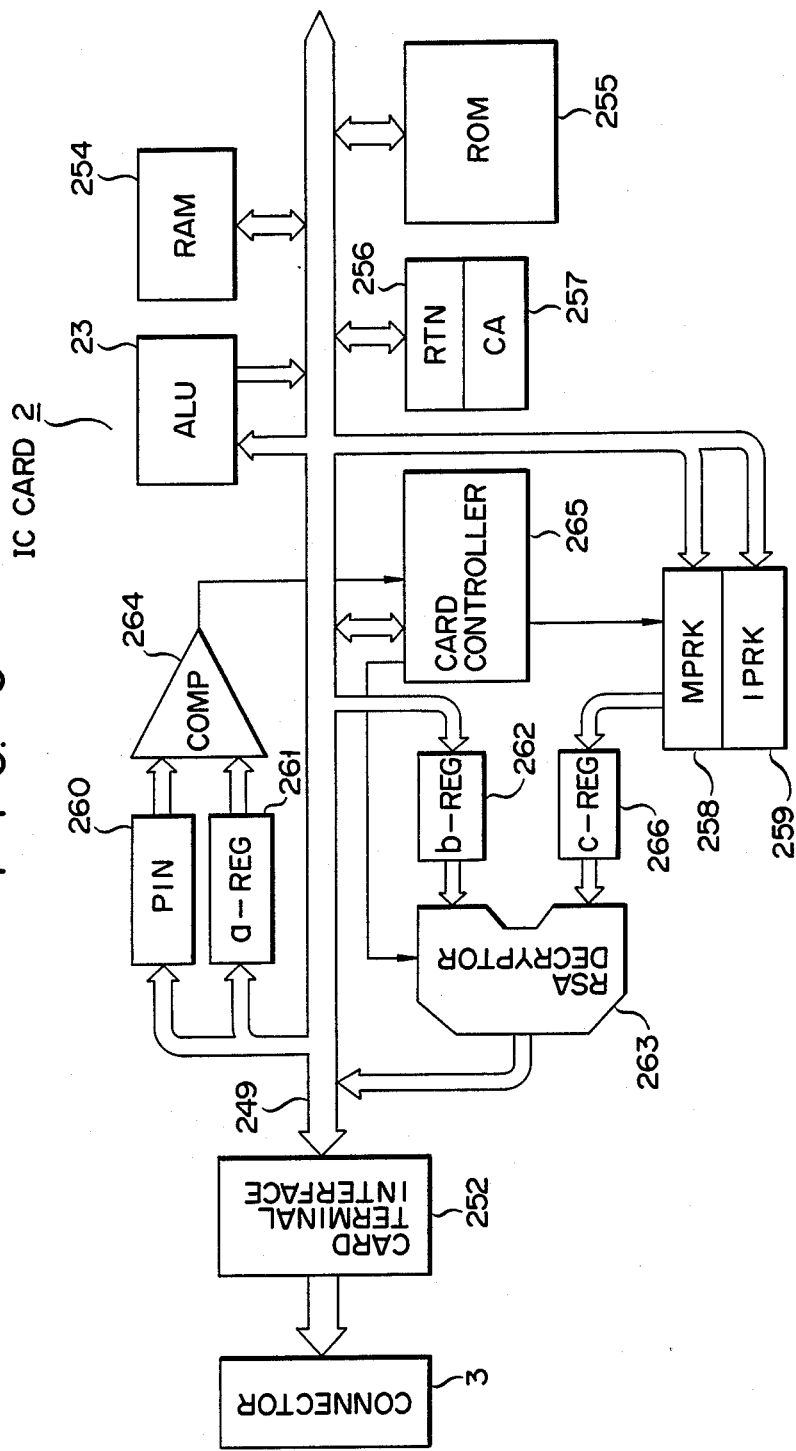
FIG. 3 is a schematic block diagram of the IC shown in FIG. 1.

In FIG. 3, connector 3 is connected to a bus line 249 through a card terminal interface 52. To bus line 249, there are connected identification code processor 23, a processor RAM 254, a system program ROM 255, an PTN (Retry Number) memory 256 to store the number of retry times of data RTN, and a CA memory 257 in which a CA (Card Authenticator) code is stored. This CA code is the code of, e.g., 64 bits which differs for every card to identify individual IC card 2. The CA code is set when the IC card is manufactured and used to encrypt and decrypt the message. To bus line 249, there are also connected an MPRK memory 258 to store an MPRK (Manufacturer Private Key Code), an IPRK memory 259 to store an IPRK (Issuer Private Key Code), a PIN memory 260 to store the personal identification number (PIN), an a register 261 (a-REG), a b register 262 (b-REG), and an RSA decrypter 263 to decrypt the encryption data encrypted by RSA encrypter 121 in FIG. 2 on the basis of the RSA encryption system.

The MPRK code which is stored into MPRK memory 258 is the code to decrypt the encryption which is set by the manufacturer. This MPRK code corresponds to the MPUK code which is set into MPUK memory 126 in FIG. 2. The IPUK code which is stored into IPRK memory 259 is the code to decrypt the encryption which is set by the issuer. This IPUK code corresponds to the IPUK code which is set into IPUK memory 127 in FIG. 2. The personal identification number PIN which is stored into PIN memory 260 is set to arbitrary numbers by the card user in a well-known manner. The personal identification number PIN sent from the card terminal is written into a-REG 261 and the data held therein is sent to a comparison unit 264 together with the content set into PIN memory 260. Comparison unit 264 discriminates whether both input data from PIN memory 260 and a-REG 261 coincide or not and outputs the result of the comparison to a card controller 265. Card controller 265 selects between MPRK memory 258 and IPRK memory 259 in response to the signal from comparison unit 264 and makes RSA decrypter 263 operative. The code read out from MPRK memory 258 or IPRK memory 259 is sent to RSA decrypter through a c register 266 (c-REG). The data from card terminal 1 (see FIGS. 1 and 2) is inputted to RSA decrypter 263 through b-REG 262. RSA decrypter 263 decrypts the data held in b-REG 262 in accordance with the code stored into c-REG 266 from MPRK memory 258 or IPRK memory 259.

DETAILED OPERATIONS OF CARD TERMINAL AND IC CARD

Referring now to flow charts illustrated in FIGS. 4 and 5, operations of card terminal 1 and IC card 2 as shown in FIGS. 2 and 3 will be described in detail.

As an initial condition, store staff or bank clerk turns on card terminal 1 to initialize the internal circuitry of card terminal 1. Then card terminal 1 is ready for accepting IC card 2 through connector 3. As shown in step A1 in FIG. 4, the entire system is in the waiting condition until personal identification number PIN is input from key-in unit 116. When PIN is input from key-in unit 116 by the card user, card terminal 1 sends this PIN to IC card 2 through IC card interface controller 122 and connector 3 as shown in step A2. Thereafter, as shown in step A3, the remaining system enters the waiting condition until an "OK" message or an "INVALID" message is sent from IC card 2.

Figure 5A:
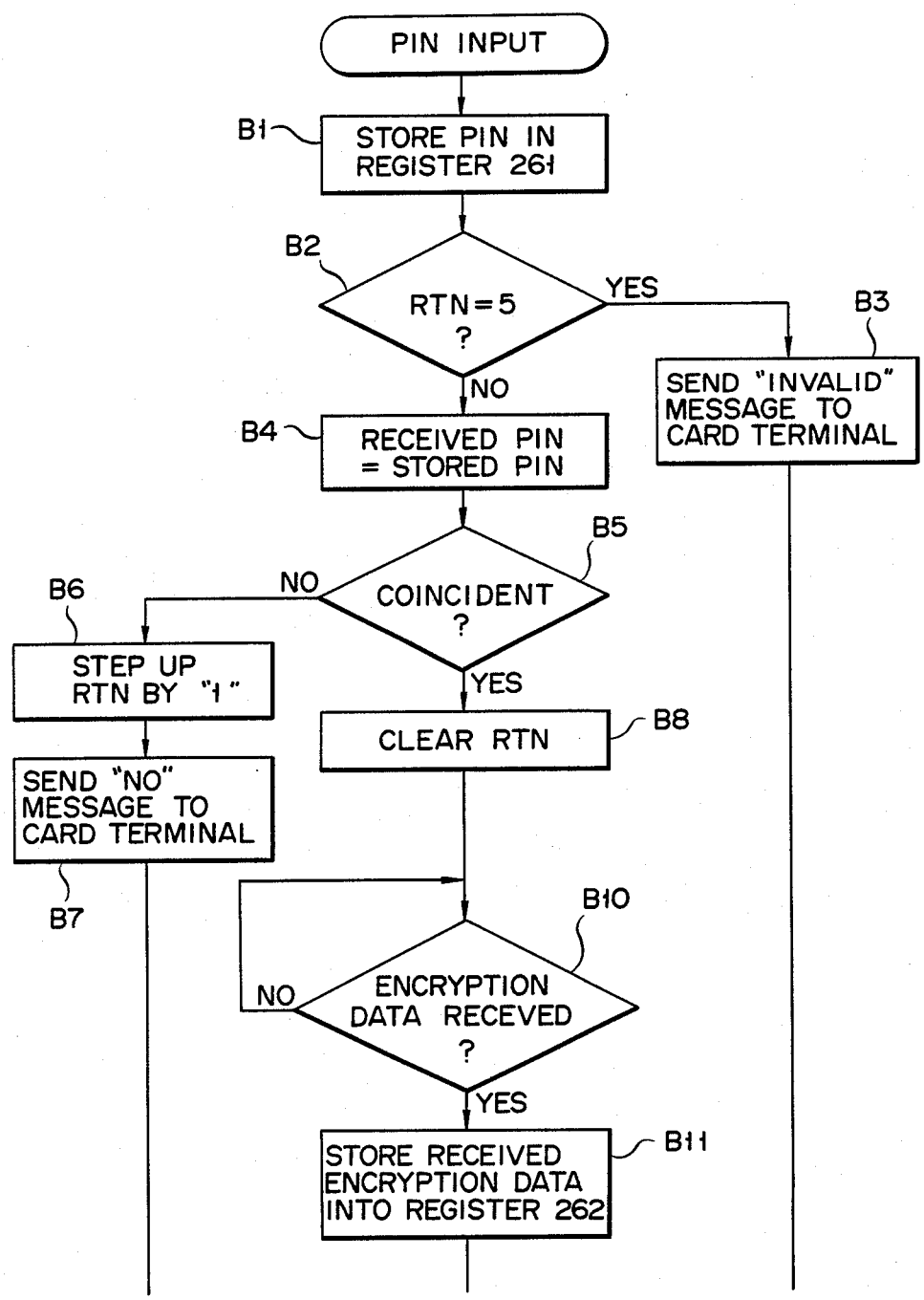
FIGS. 5A and 5B show a flow chart of operations of the IC card shown in FIG. 3.
Figure 5B:
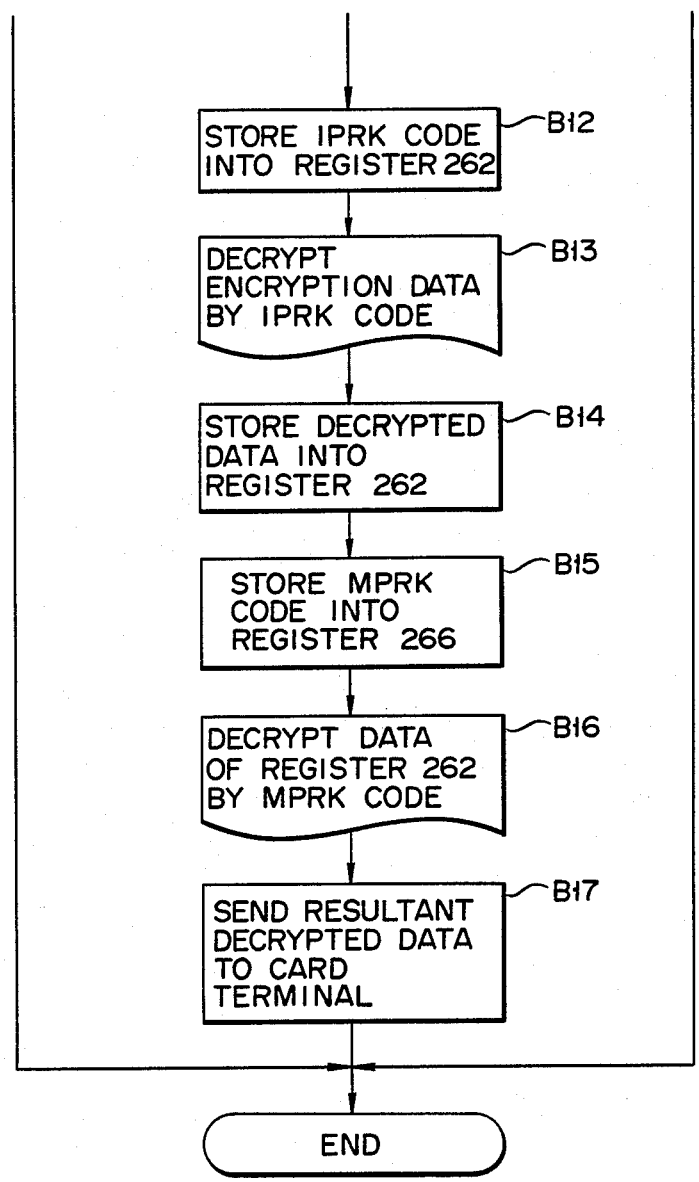

On one hand, when PIN is sent from card terminal 1, IC card 2 stores this PIN into a-REG 261 as shown in step B1 in FIG. 5. A check is made to see if data reinput number of times RTN stored in RTN memory 256 has become "5" or not in next step B2. When RTN has already become "5", step B3 follows and the "INVALID" message is sent to card terminal 1 and the processes of the IC card are finished. The content of RTN memory 256 is "0" in the initial condition and the result of the discrimination in step B2 is normally "NO", so that step B4 follows. In step B4, personal identification number PIN stored in a-REG 261 from card terminal 1 is compared with personal identification number PIN preset in PIN memory 260. A check is made to see if both PIN coincide or not in step B5. If NO, step B6 follows and the content of RTN memory 256 is inclemented by "+1". Thereafter, the "NO" message is sent to card terminal 1 as shown in step B7. If both PIN coincide in step B5, the content of RTN memory 256 is cleared in step B8. As described above, IC card 2 checks the card user to see if he is the authorized person or not and sends the check message to card terminal 1. Then, in step B10, IC card 2 enters the waiting condition until the encryption data, i.e., identification code is sent from card terminal 1.

Figure 4A:
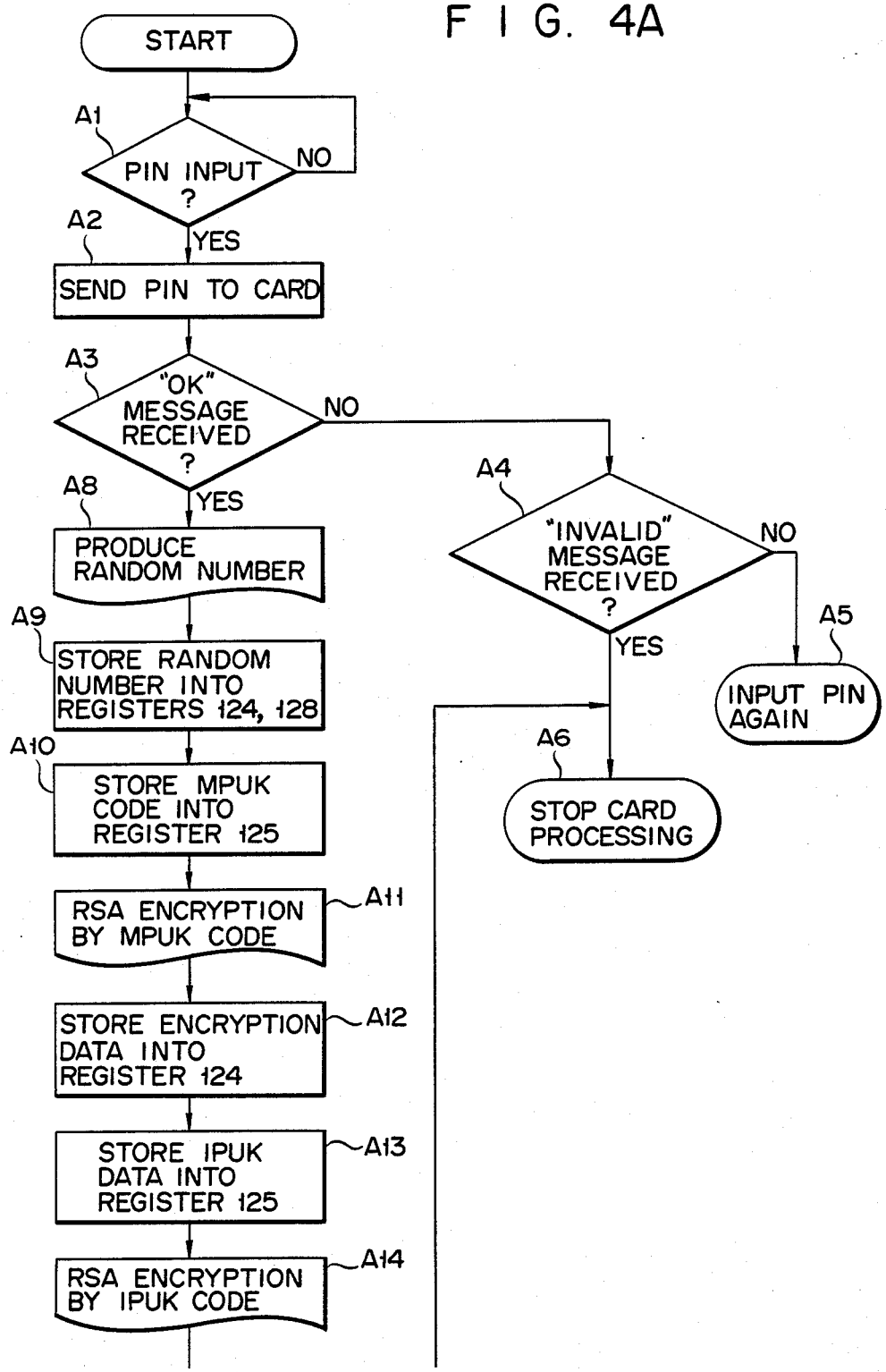
FIGS. 4A and 4B show a flow chart of operations of the card terminal shown in FIG. 2.
Figure 4B:
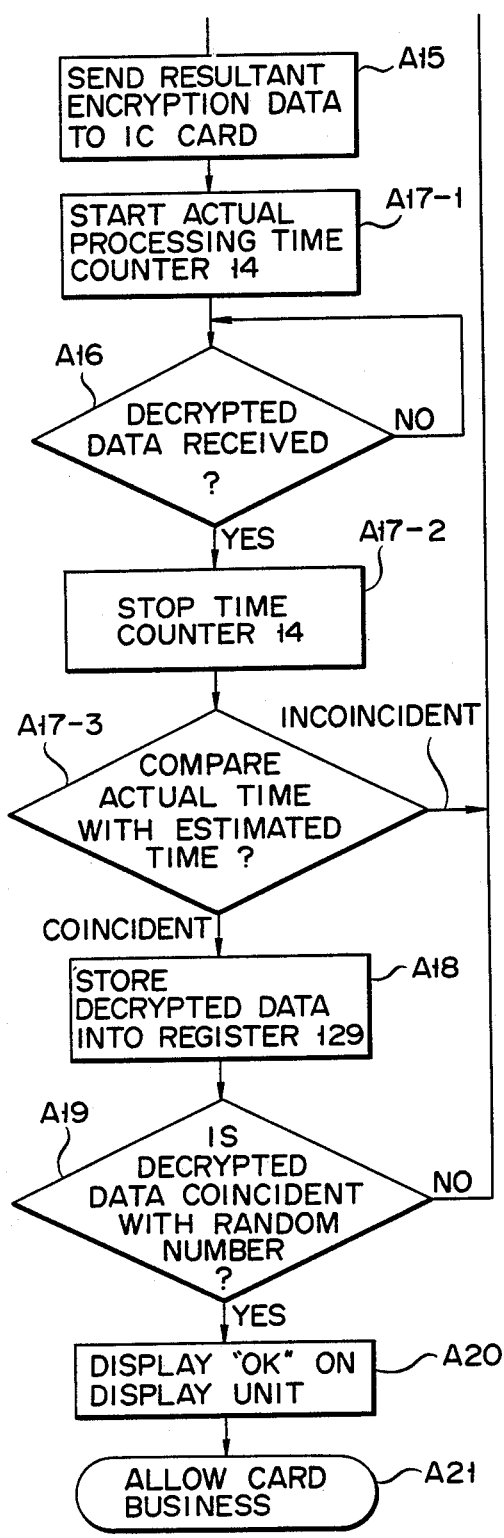

Next, in step A3 in FIG. 4, card terminal 1 is in the waiting condition until the check message is sent from IC card 2 as mentioned above and when the check message is sent from IC card 2, card terminal 1 checks to see if this check message is the "OK" message or not. If NO, a check is made in step A4 to see if the check message is the "INVALID" message or not. In the case where the "OK" message is not sent and the check message is not the "INVALID" message, it is the "NO" message. Therefore, as shown in step A5, an instruction message to input PIN again is displayed in display unit 118. If PIN is not coincident even when it is inputted five times due to the reinput instruction, the "INVALID" message is outputted from IC card 2, so that the card processing is stopped in step A6 from step A4.

If the "OK" message was sent in step A3, a random number is generated from random number data generator 120 as shown in step A8. This random number is stored into A-REG 124 and C-REG 128 in step A9. Thereafter, in step A10, MPUK memory 126 is selected by terminal controller 11 and the MPUK code is stored into B-REG 125. As shown in step A11, the random number stored into A-REG 124 is encrypted by the MPUK code stored in B-REG 125 and the encryption data is stored into A-REG 124 in step A12. Then, the IPUK code is read out from IPUK memory 127 and stored into B-REG 125 in step A13. As shown in step A14, the data stored into A-REG 124 is again encrypted by RSA encrypter 121 in accordance with the IPUK code stored into B-REG 125 and this encryption data is sent to IC card 2 in step A15. When the resultant encryption data is sent to IC card 2 as mentioned above, card terminal 1 enters the waiting condition in step A16 until the decryption data is sent from IC card 2. In this case, however, actual processing time counter 14 (see FIGS. 1 and 2) is initialized as shown in step A17-1.

When the encryption data is sent to IC card 2 from card terminal 1, IC card 2 detects the encryption data in step B10 in FIG. 5 and stores this encryption data into b-REG 262 in step B11. In next step B12, the IPRK code is read out from IPRK memory 259 and stored into c-REG 266. The encryption data held in b-REG 262 is decrypted by RSA decrypter 263 by the IPRK code as shown in step B13. In step B14, the decryption data is stored into b-REG 262 and thereafter the MPRK code stored in MPRK memory 258 is stored into c-REG 266 in step B15. As shown in step B16, the data held in b-REG 262 is decrypted by RSA decrypter 263 by the MPRK code. The resultant decryption data is sent to card terminal 1 in step B17. In this manner, the processes by IC card 2 are completed.

When the decryption data is sent to card terminal 1 from IC card 2 as described above, card terminal 1 checks to see if the decrypted data from IC card 2 has been received or not in step A16 in FIG. 4. When the decrypted data has been received, the counting operation of actual processing time counter 14 is stopped (step A17-2). Next, the actual processing time for decrypting the encryption data in IC card 2 measured by time counter 14 is compared with the estimated time sent from processing time estimation unit 13 by comparison unit 15. If they substantially coincide or completely coincide, next step A-18 follows. If they are not coincident, the card processing is stopped in step A6.

In step A18, the decrypted data is stored into D-REG 129.

Thereafter, in step A19, the random number stored in C-REG 128 in step A9 is compared with the decrypted data stored in D-REG 129 by comparison unit 15, thereby checking whether they coincide or not from the result of the comparison. If they are not coincident, this means that the data encrypted by card terminal 1 was not correctly decrypted by IC card 2. In this case, however, the decryption processing time is determined to be the authorized time in step A17-3. Namely, this denotes that IC card 2 does not store the correct MPRK or IPRK or does not have authorized RSA decrypter 263, so that it is determined that this IC card is not the authorized card issued from the authorized manufacturer and issuer and the card processing is stopped as shown in step A6. The key codes stored in MPUK memory 126 and IPUK memory 127 respectively correspond to the key codes stored into MPRK memory 258 and IPRK memory 259 in IC card 2 by the manufacturer or issuer and are used for encryption based on the RSA algorithm. On the other hand, the key codes stored in MPRK memory 258 and IPRK memory 259 are used for decryption based on the RSA algorithm. Namely, the "PUK" (Public Key Code) and "PRK" (Private Key Code) are the key codes having the one-to-one correspondence relation by a single directional function based on the RSA algorithm. According to the encryption system based on the RSA algorithm, the data encrypted by the "PUK" is fairly hard to be decrypted by the same "PUK" but can be decrypted only by the "PRK" having the corresponding relation due to the function as mentioned above.

The encryption system based on the RSA algorithm has been disclosed in detail in Cael H, Meyer and Steffhen M, Matyas, "CRYPTOGRAOHY" issued by John Wiley & Sons, Inc., 1982.

If YES in discrimination step A19, the IC card is proved to be the authorized or valid IC card. Thus, the "OK" message is displayed in display unit 118 and the business by the card is executed (step A21).

The above description of the preferred embodiment will be summarized as follows. Two encrypted key codes, i.e., MPUK and IPUK codes which are determined by the manufacturer and issuer of the IC card respectively are stored in the card terminal. Predetermined data, namely, random number is encrypted by those two key codes and this encrypted code is sent to the IC card. The IC card decrypts the encrypted data sent from the card terminal by use of two key codes which are stored into the IC card in correspondence to the specific key codes, i.e., IPUK and MPUK codes stored in the card terminal. The IC card then sends the decrypted data to card terminal. The decrypted data sent from the IC card is detected by the card terminal. Further, in the card terminal, the estimated processing time is pre-calculated on the basis of the encryption data, and the actual decryption processing time of the IC card is compared with this estimated processing time, thereby identifying the validity of the IC card. Therefore, the IC card is checked twice by two key codes. Even if one key code is stolen, it is difficult to make forged cards unless the other key code is known. Therefore, the forgery of IC cards can be surely avoided. Even in the case of the off-line, it is possible to certainly identify that the authorized card business was performed at the time of the card business.

According to the present invention, it will be obviously understood that the invention can be realized even if the functions of the IC card and card terminal mentioned above are replaced, respectively.

In the case of the "RSA" encryption system, reliability of the encryption data depends on the number of digits of the encrypted key code. It has been known that there is a tendency that the reliability deteriorates in a manner of an exponential function if the number of digits is decreased to reduce the burden of the hardware of the system. Therefore, according to the identification system of the present invention, it is possible to provide an identification system in which even in the case where the number of digits of the encrypted key code is small, the distant apparatus can be identified by the simple hardware and software and also the encrypted key code cannot be easily analyzed nor imitated.

While the invention has been described above, it should be understood that the above-described embodiment of the invention is illustrative only, and that modifications thereof may occur to those skilled in the art. Accordingly, this invention is not to be regarded as limited to the embodiment disclosed herein, but is to be limited only as defined by the appended claims.

For instance, in the embodiment, the decrypted data received in reception unit 17 in card terminal 1 is not processed at all. However, instead of directly transmitting identification code data "n" from card terminal 1, it is also possible to preliminarily perform the functional operation f(n) in card terminal 1 and calculate its inverse function $n' = f^{-1}(n)$ in identification code processor 23 in IC card 2 and compare n and n'. This method can be applied to the RSA encryption system.

In addition, the embodiment has been described with respect to the case where the invention was embodied to card terminal 1 as the identification unit and IC card 2 as the unit to be identified. However, for example, even in the case where the host computer identifies the terminal device, or the like, the invention can be also similarly embodied.

It is apparent that either the key code IPUK or MPUK may be used to encrypt the random number, while in this case, only the key code IPRK or MPRK is used in the IC card.

What is claimed is:

1. An identification system wherein validity between a first unit and a second unit is identified when the first unit is electrically communicated with the second unit, said first unit including:
    means for generating identification code information;
    means for calculating, based upon the identification code information, an estimation time required for processing the identification code information in the second unit;
    means for measuring an actual time required for completely processing the identification code information in the second unit, and
    means for identifying validity between said first and second units by comparing the actual processing time to the estimation processing time; and
    said second unit including:
    means for processing the identification code information sent from said first unit.

2. A system as claimed in claim 1, wherein when the actual processing time is substantially equal to the estimation processing time, validity between said first and second units is identified in the identifying means.

3. A system as claimed in claim 1, wherein the identification code generating means of said first unit includes:
    means for generating random number data in relation to the communicated second unit, and
    an encryptor for producing encryption data as the identification code data based upon the random number data.

4. A system as claimed in claim 3, wherein the encryptor is an RSA encryptor utilizing an RSA data encryption algorithm.

5. A system as claimed in claim 4, further comprising:
    a first memory for storing a manufacture public key code (MPUK), and
    a second memory for storing an issuer public key code (IPUK), whereby the RSA encryptor encrypts the random number data by utilizing said MPUK and IPUK codes in accordance with the RSA data encryption algorithm.

6. A system as claimed in claim 1, wherein said identification code information generating means includes an encryptor for producing encryption data corresponding to the identification code information.

7. A system as claimed in claim 6, wherein the encryptor is an RSA encryptor utilizing an RSA data encryption algorithm and a first memory is provided with the RSA encryptor for storing a specific encryption key code, whereby said RSA encryptor produces the encryption data by utilizing the specific encryption key code stored in the first memory.

8. A system as claimed in claim 1, wherein the estimation processing time is determined only by an architecture and also a processing algorithm of the identification code information processing means of said second unit.

9. A system as claimed in claim 1, wherein the identification code processing means of said second unit includes a decryptor for decrypting the identification code information sent from the first unit.

10. A system as claimed in claim 9, wherein the decryptor is an RSA decryptor utilizing an RSA data decryption algorithm.

11. A system as claimed in claim 10, further comprising:
    a third memory for storing an issuer private key code (IPRK), and a fourth memory for storing a manufacture private key code (MPRK), whereby the RSA decryptor decrypts the identification code information sent from the first unit by utilizing said IPRK and MPRK codes in accordance with the RSA data decryption algorithm.

12. A system as claimed in claim 7, wherein the decryptor is an RSA decryptor utilizing an RSA data decryption algorithm and a second memory is provided with the RSA decryptor for storing a specific decryption key code, whereby said RSA decryptor decrypts the encryption data by utilizing the specific decryption key code stored in the second memory.

13. A system as claimed in claim 1, wherein said first unit is an IC card terminal and said second unit is an IC card.

14. A system as claimed in claim 13, wherein the IC card terminal is initialized by receiving a personal identification number when electrically communicated with the IC card.

* * * * *